(12) United States Patent
Kim et al.

(10) Patent No.: US 11,180,049 B2
(45) Date of Patent: Nov. 23, 2021

(54) MOBILE MODULAR BATTERY CHARGING AND EXCHANGE SYSTEM

(71) Applicant: Honda Motor Co., Ltd., Tokyo (JP)

(72) Inventors: Michael Jin Kim, Long Beach, CA (US); Robert Uyeki, Torrance, CA (US); Peter Douglas Corey, Redondo Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 268 days.

(21) Appl. No.: 16/559,035

(22) Filed: Sep. 3, 2019

(65) Prior Publication Data
US 2021/0061124 A1    Mar. 4, 2021

(51) Int. Cl.
*B60L 53/80*     (2019.01)
*B60L 50/60*     (2019.01)
*B60L 58/10*     (2019.01)
*H02J 7/00*      (2006.01)
*G06Q 30/02*     (2012.01)
*B60R 5/02*      (2006.01)
*B60S 5/06*      (2019.01)

(52) U.S. Cl.
CPC .............. *B60L 53/80* (2019.02); *B60L 50/66* (2019.02); *B60L 58/10* (2019.02); *B60R 5/02* (2013.01); *B60S 5/06* (2013.01); *G06Q 30/0283* (2013.01); *H02J 7/0027* (2013.01)

(58) Field of Classification Search
CPC .......... B60L 53/80; B60L 50/66; B60L 58/10; B60L 50/60; H02J 7/0027; H02J 7/00; G06Q 30/0283; B60R 5/02; B60S 5/06
See application file for complete search history.

(56) References Cited

U.S. PATENT DOCUMENTS

| 9,887,570 | B2 | 2/2018 | Johnsen et al. |
| 9,970,778 | B2 | 5/2018 | Aich et al. |
| 2010/0072946 | A1* | 3/2010 | Sugano .................. B60L 53/51 320/108 |
| 2010/0235088 | A1* | 9/2010 | Li ........................ G05D 1/0214 701/533 |

(Continued)

FOREIGN PATENT DOCUMENTS

| CN | 107379979 | 11/2017 |
| DE | 102010042018 | 4/2012 |

(Continued)

*Primary Examiner* — Vuthe Siek
(74) *Attorney, Agent, or Firm* — Rankin, Hill & Clark LLP (57) ABSTRACT

A method and system for mobile charging and exchange includes a vehicle having a vehicle storage space and a selectively removable charging bin mounted into the vehicle storage space. The selectively removable charging bin has one or more form fitted receptacle slots for receiving a battery device and each receptacle slot has a connection therein to a power source of the vehicle. A processor is operatively connected for computer communication to the vehicle and a user device using a server over a network. The processor receives an exchange request from the user device and calculates an exchange cost for the exchange request. The processor manages access to the vehicle storage space according to the exchange request and the exchange cost to allow removal of the battery device from the receptacle slot and insertion of a used user battery device into the receptacle slot.

20 Claims, 5 Drawing Sheets

(56) References Cited

U.S. PATENT DOCUMENTS

| | | | |
|---|---|---|---|
| 2011/0198137 A1* | 8/2011 | Paschoal | B60G 3/20 |
| | | | 180/65.1 |
| 2012/0005031 A1 | 1/2012 | Jammer | |
| 2015/0046343 A1* | 2/2015 | Martini | G06Q 30/0278 |
| | | | 705/306 |
| 2016/0031517 A1 | 2/2016 | Neugebauer et al. | |
| 2017/0021763 A1* | 1/2017 | Melaragni | B60R 1/00 |
| 2018/0126892 A1 | 5/2018 | Souschek et al. | |

FOREIGN PATENT DOCUMENTS

| | | |
|---|---|---|
| DE | 102013020180 | 4/2015 |
| DE | 102014214071 | 1/2016 |
| DE | 102016007378 | 12/2017 |
| DE | 102017212894 | 1/2019 |
| EP | 1174976 | 1/2002 |
| WO | 2012048882 | 4/2012 |
| WO | 2013072306 | 5/2013 |

* cited by examiner

MOBILE MODULAR BATTERY CHARGING AND EXCHANGE SYSTEM

BACKGROUND

With advances in electric vehicles and micro-mobility transportation, there is an increase in demand for affordable, efficient, and accessible battery charging infrastructures and battery storage. Typically, charging takes place at home while an electric vehicle and/or a micro-mobility product remain overnight. However, certain factors such as urbanization, increasing penetration of battery devices that drain batteries faster, and a "to-go" culture may require more flexible charging and storage infrastructures. For example, mobile and public charging infrastructures that encourage battery charging, storage, sharing and swapping may be used.

BRIEF DESCRIPTION

According to one aspect, a system for mobile charging and exchange includes a vehicle having a vehicle storage space and a selectively removable charging bin mounted into the vehicle storage space. The selectively removable charging bin has one or more form fitted receptacle slots for receiving a battery device and each receptacle slot has a connection therein to a power source of the vehicle. A processor is operatively connected for computer communication to the vehicle and a user device using a server over a network. The processor receives an exchange request from the user device and calculates an exchange cost for the exchange request. The processor manages access to the vehicle storage space according to the exchange request and the exchange cost to allow removal of the battery device from the receptacle slot and insertion of a used user battery device into the receptacle slot.

According to another aspect, a vehicle for mobile charging and exchange includes a vehicle storage space and a plurality of selectively removable charging bins mounted into the vehicle storage space. Each of the plurality of selectively removable charging bins has a form fitted receptacle slot for receiving a user battery device and the receptacle slot has a connection to interface with a power source of the vehicle. A processor is operatively connected for computer communication to the vehicle and a user device using a server over a network. The processor receives an exchange request from a user device and calculates an exchange cost for the exchange request. The processor manages access to the vehicle storage space according to the exchange request and the exchange cost to allow removal of the user battery device from the receptacle slot and insertion of a used user battery device into the receptacle slot.

According to a further aspect, a computer-implemented method for mobile charging and exchange includes receiving an exchange request from a user device. The exchange request includes data about a user battery device associated with the user device including a location of the user battery device and a last-mile navigation route. The method includes selecting a vehicle in proximity to the last-mile navigation route to fulfill the exchange request. The vehicle has a vehicle storage space and a selectively removable charging bin mounted into the vehicle storage space and connected to a power source of the vehicle. Further, the method include managing access to the vehicle storage space according to the exchange request to allow removal of a battery from the selectively removable charging bin and insertion of the user battery device into the selectively removable charging bin.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Processor Area network (MAY), Local Interconnect network (LIN), among others.

"Component." as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Vehicle control system" and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 1:
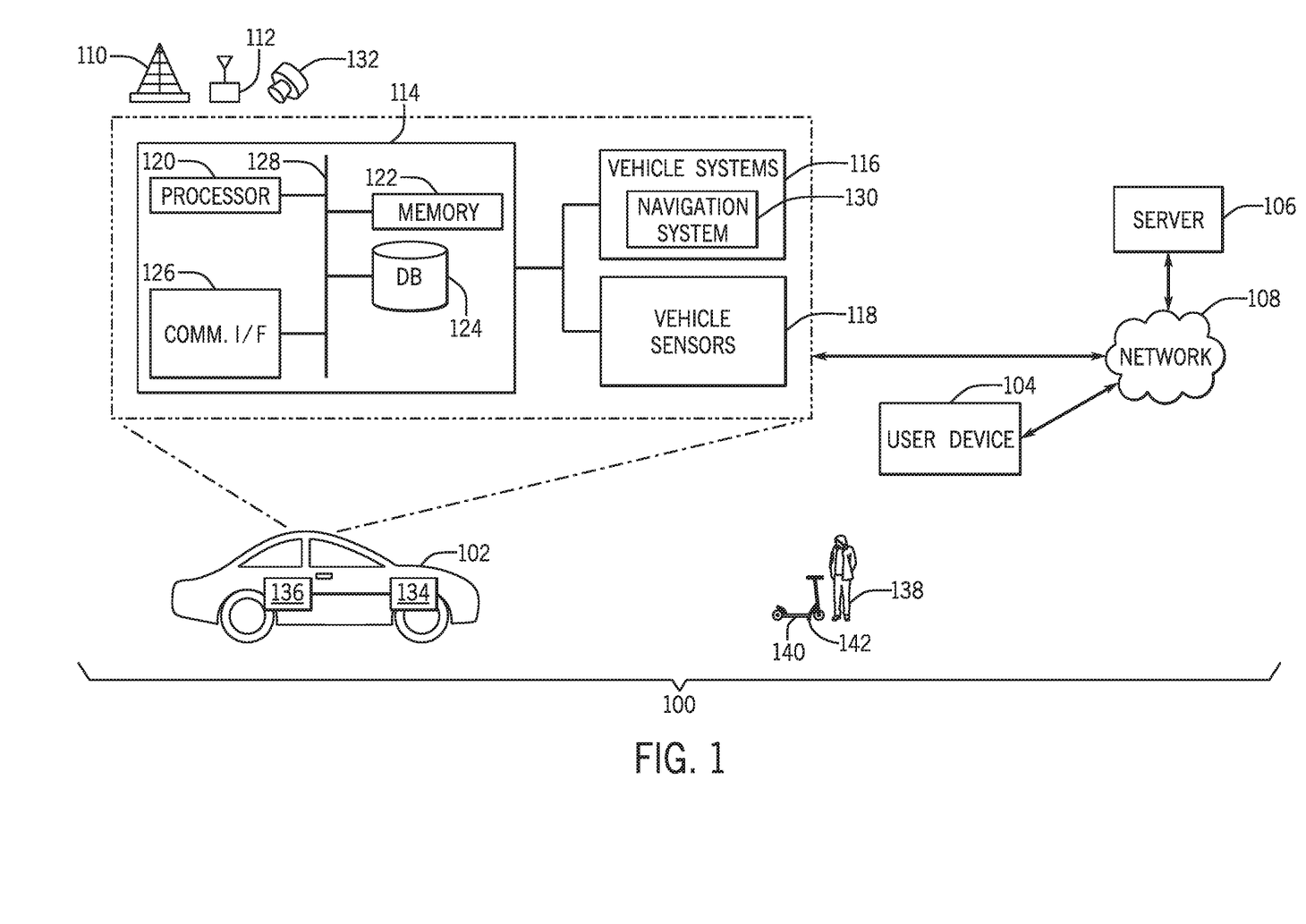
FIG. 1 is an exemplary operating environment for a mobile modular battery charging and exchange system and method according to one embodiment.

Referring now to the drawings, wherein the showings are for purposes of illustrating one or more exemplary embodiments and not for purposes of limiting same, FIG. 1 is an exemplary operating environment 100 for implementing methods and systems for mobile modular battery charging and exchange according to one embodiment. It is understood that the components of FIG. 1, as well as the components of other systems, hardware architectures, and software architectures discussed herein, may be combined, omitted, or organized into different architectures for various embodiments. As shown in FIG. 1, a vehicle (e.g., a host vehicle) 102, a user device 104, and a server 106 are operatively connected for computer communication as defined above, using, for example, a network 108 (e.g., a wireless communication network). In some embodiments, the components shown in FIG. 1 may communicate using a satellite 110, a wireless network antenna 112, and/or the network 108. It is appreciated that although only one vehicle is shown in FIG. 1, the systems and methods discussed herein may be applied to plurality of vehicles.

The vehicle 102 includes a computing device 114, vehicle systems 116, and vehicle sensors 118. The computing device 114 includes a processor 120, a memory 122, a database (e.g., a data store, a disk) 124, and a communication interface (I/F) 126, which are each operably connected for computer communication via a bus 128 and/or other wired and wireless technologies defined herein. As will be discussed herein, the computing device 114 may include provisions for processing, communicating and interacting with various components of the vehicle 102 and other components of the operating environment 100, including the user device 104 and the server 106.

The vehicle systems 116 as used herein may include, but are not limited to, any type of vehicle control system and/or vehicle system described herein to enhance the vehicle 102 and/or driving of the vehicle 102. For example, in FIG. 1, the vehicle systems 116 includes a navigation system 130. The navigation system 130 may include hardware (e.g., sensors) and software to determine and/or acquire position data about the vehicle 102. For example, the navigation system 130 may include a global positioning system (GPS) unit (not shown) and/or an inertial measurement unit (IMU) (not shown). Thus, the navigation system 130 may provide a geoposition of the vehicle 102 based on satellite data from, for example, a global position source 132, or from any Global Navigational Satellite infrastructure (GNSS), including GPS, Glonass (Russian) and/or Galileo (European). The navigation system 130 may also provide route finding and directions. Although FIG. 1 only shows the navigation system 130, it is understood that the vehicle systems 116 may include any other type of number of vehicle systems as defined herein.

The vehicle sensors 118, which may be implemented in whole or in part with the vehicle systems 116, may include various types of sensors for use with the vehicle 102 and/or the vehicle systems 116 for detecting and/or sensing a parameter of the vehicle 102, the vehicle systems 116, and/or the environment surrounding the vehicle 102. The vehicle sensors 118 may include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the vehicle sensors 118 may be any type of sensor, for example, acoustic, electric, environmental, optical, imaging, light, pressure, force, thermal, temperature, proximity, among others.

Referring again to the computing device 114, the processor 120 may include logic circuitry with hardware, firmware, and software architecture frameworks. Thus, in some embodiments, the processor 120 may store application frameworks, kernels, libraries, drivers, application program interfaces, among others, to execute and control hardware and functions discussed herein. In some embodiments, the memory 122 and/or the database 124 may store similar components as the processor 120 for execution by the processor 120.

The communication interface 126 may include software and hardware to facilitate data input and output between the components of the computing device 114 and other components of the operating environment 100. Specifically, the communication interface 126 may include network interface controllers (not shown) and other hardware and software that manages and/or monitors connections and controls bi-directional data transfer between the communication interface 126 and other components of the operating environment 100 using, for example, the user device 104, the server 106, and/or the network 108.

As will be discussed in more detail herein with FIGS. 2A and 2B, the vehicle 102 also includes a vehicle storage space 134 for storing and charging battery and/or battery devices associated with the user device 104, using, for example, a power source 136 of the vehicle 102. In particular, the user device 104 may be associated with a user 138 and a battery device 140. The user device 104 may be a computing device, and although not shown in FIG. 1, the user device 104 may include the same or similar components (e.g., processor) as the computing device 114. In some embodiments, the user device 104 is a smart phone associated with the user 138. In other embodiments, the user device 104 may be integrated with the battery device 140. The battery device 140 may be any device that is powered by a battery or other type of rechargeable power source. For example, in FIG. 1, the battery device 140 is a bike powered by a battery 142. However, it is understood that the systems and methods described herein could also be implemented with a stand-alone battery (e.g., a battery not integrated with a battery device) or a battery that is integrated with the user device 104. The battery device 140 may be any device that is powered by a battery (e.g., the battery 142) or other type of rechargeable power source. The battery 142 may be any type of battery or rechargeable power source, for example, nickel cadmium battery, nickel-metal hydride battery, lead acid battery, lithium ion battery, lithium ion polymer battery, among others.

In some embodiments, the battery device 140 is a last-mile device, for example, micro-mobility transportation devices, which may include, but are not limited to, a bike, a scooter, a robot, a drone. In FIG. 1, the battery device 140 is a bike associated with the user device 104 and/or the user 138. For example, the user device 104 may be a smart phone operatively connected for computer communication to the battery device 140. However, in other embodiments, the user 138 may be an entity that controls and/or owns the battery device 140. For example, a delivery service that controls robotic delivery devices.

As will be discussed in further detail herein, the server 106 may facilitate mobile modular battery charging and exchange and the interactions between the vehicle 102, the user device 104, and the server 106. In some embodiments, the server 106 is operated by an Original Equipment Manufacturer (OEM). It is understood that the server 106 may be a computing device and may include the same or similar components (e.g., processor) as the computing device 114. In some embodiments, the server 106 acts as an intermediary between the vehicle 102 and the user device 104. The vehicle 102 may be part of a fleet of vehicles or a plurality of vehicles (not shown) associated with the OEM.

Figure 2A:
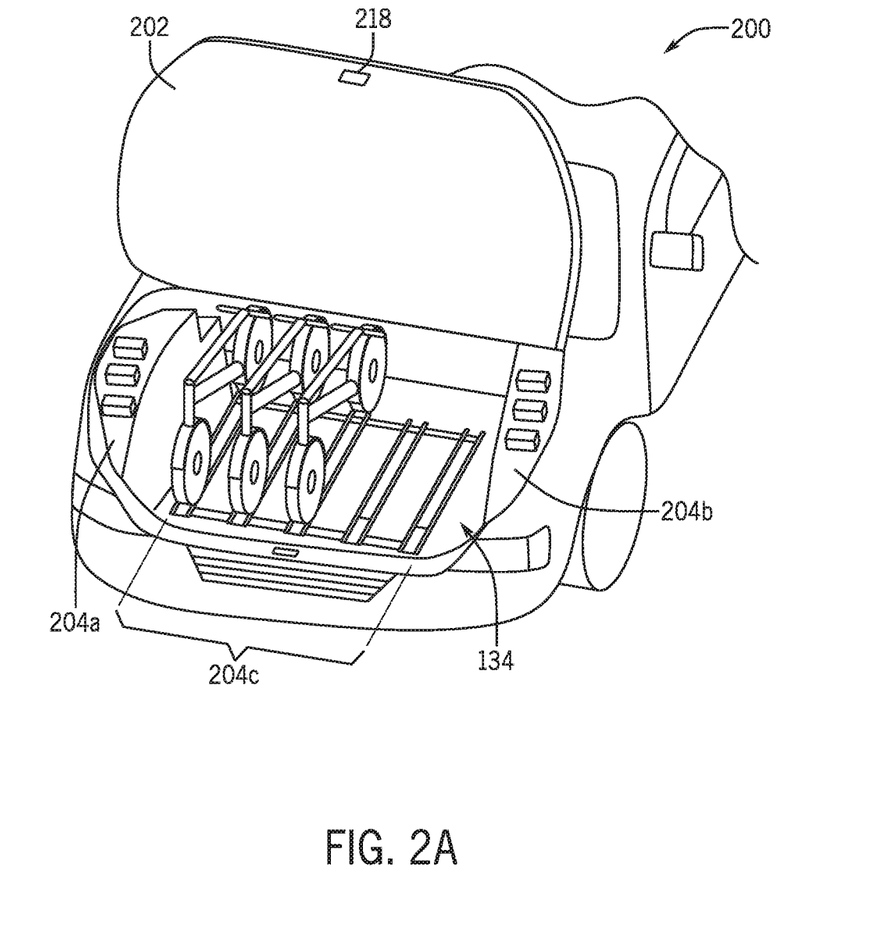
FIG. 2A is a schematic view of a front region of the vehicle of FIG. 1 showing a vehicle storage space according to one embodiment.
Figure 2B:
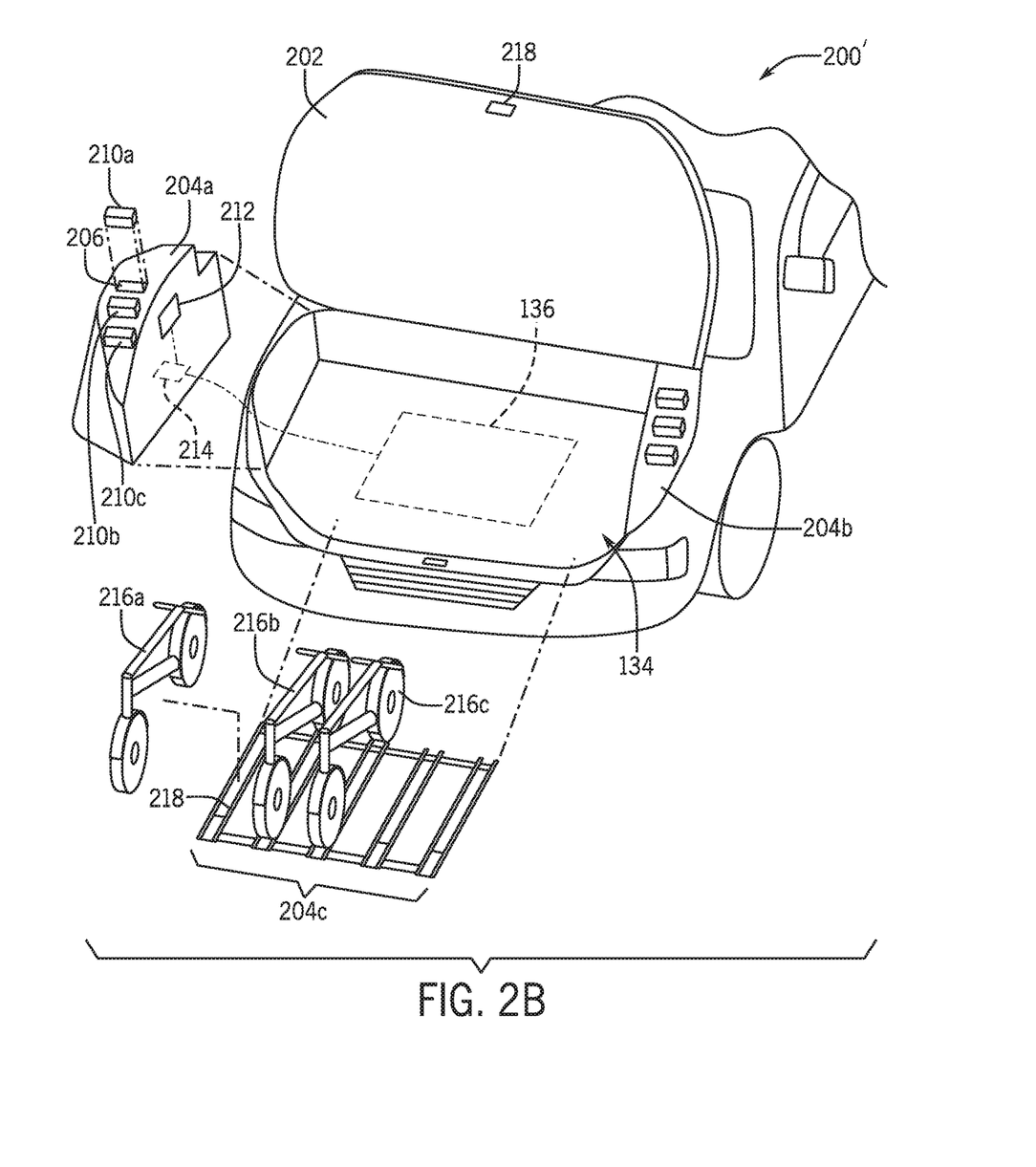
FIG. 2B is the schematic view of FIG. 2A showing removal of a selectively removable charging bin and battery according to one embodiment.

Referring now to FIGS. 2A and 2B, the vehicle storage space 134 will be described in more detail. FIG. 2A is a schematic view of a front region 200 of the vehicle 102 including the vehicle storage space 134. Thus, in this embodiment, the vehicle storage space 134 is located in the front region 200 of the vehicle 102, in particular, under a front hood 202 of the vehicle 102. It is understood that in some embodiments, the vehicle storage space 134 may be located in a rear region (not shown) of the vehicle 102, for example, a trunk (not shown) of the vehicle 102. The vehicle storage space 134 is a cavity within the vehicle 102 that may hold one or more selectively removable charging bins. For example, in FIG. 2A, a selectively removable charging bin 204*a*, a selectively removable charging bin 204*b*, and a selectively removable charging bin 204*c* are mounted in the vehicle storage space 134. The selectively removable charging bins 204*a*, 204*b*, and 204*c* are selectively removable by an owner and/or operator (not shown) of the vehicle 102, thereby allowing for modular storage and charging in the vehicle storage space 134.

In FIG. 2B, a front region 200' of the vehicle 102 is shown where the selectively removable charging bin 204*a* and the selectively removable charging bin 204*c* are removed from the vehicle storage space 134. Accordingly, an operator (not shown) of the vehicle 102 may mount the selectively removable charging bins 204*a*, 204*b*, and 204*c* in different configurations, add more selectively removable charging bins (e.g., more than three), or remove one or more selectively removable charging bins (e.g., less than three). In some embodiments, the selectively removable charging bins 204*a*, 204*b*, and 204*c* detachably latch to a surface of the vehicle storage space 134 thereby providing removable and configurable placement of the selectively removable charging bins 204*a*, 204*b*, and 204*c*.

Each of the selectively removable charging bins 204*a*, 204*b*, and 204*c* have one or more form fitted receptacle slots. For example, FIG. 2B illustrates a form fitted receptacle slot 206 for receiving a battery 210*a*. Although not shown in detail, form fitted receptacle slots are also provided for a battery 210*b* and a battery 210*c*. The battery device 210*a* is an example of a removable battery or a standalone battery from a device (e.g., the user device 104) associated with the user 138. However, the selectively removable charging bins may be form fitted for any type of battery device. For example, the selectively removable charging bin 204*c* is form fitted for receiving a battery (not shown) of a bike 216*a*, a battery (not shown) of a bike 216*b*, and a battery (not shown) of a bike 216*c*. Thus, in this example, the battery device is a micro-mobility device and the form fitted receptacle slot is form fitted according to the shape of the micro-mobility device. Accordingly, one or more of the selectively removable charging bins 204*a*, 204*b*, and 204*c* have receptacle slots with different shapes to form fit different battery types and different battery devices.

Each receptacle slot and/or selectively removable charging bin has a connection therein to the power source 136 of the vehicle 102. As shown in FIG. 2B, a connection interface 212 is provided inside the receptacle slot 206 to interface (e.g., connect) with the battery device 210*a*. Additionally, a connection interface 214 between the selectively removable charging bin 204*a* and the power source 136 facilitates exchange of power from the power source 136 to the battery device 210*a* via the communication interface 212.

Additionally, each receptacle slot and/or selectively removable charging bin may include sensors (e.g., vehicle sensors 118) that obtain data about the selectively removable charging bin, the receptacle slots, and the batteries and/or devices engaged with the receptacle slots. As will be discussed in more detail herein, this data is used by the computing device 114 and/or transferred to the server 106 to facilitate pairing with the vehicle 102. It is appreciated that each receptacle slot and/or selectively removable charging bin may be configured for computer communication according to wired or wireless protocols described herein.

The vehicle 102 may also include a lock mechanism 218. It is understood that the lock mechanism 218 may be implemented in different configurations than that shown in FIGS. 2A and 2B. As will be discussed herein, the vehicle 102 may manage access to the vehicle storage space 134 via the lock mechanism 218 to facilitate sharing and swapping of user devices.

Figure 3:
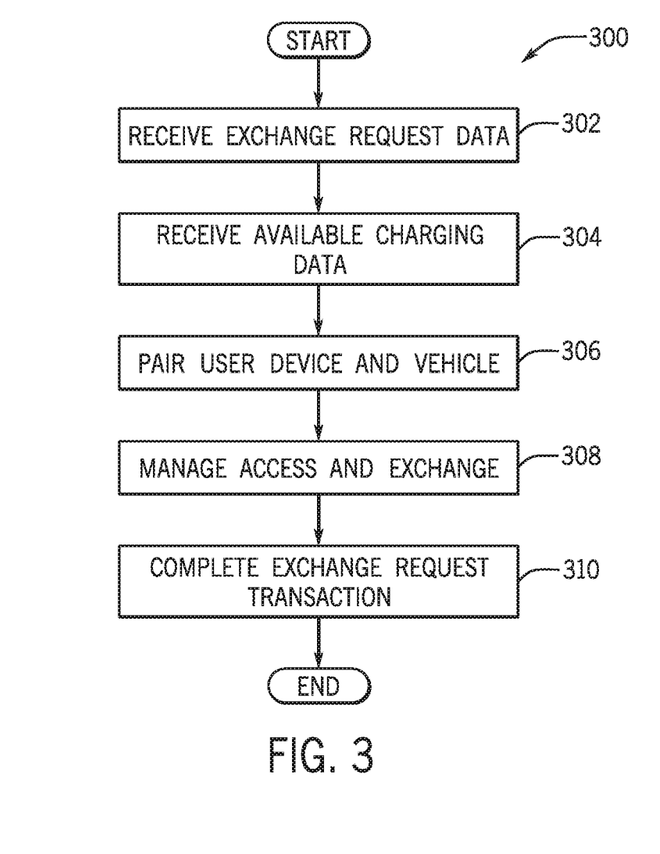
FIG. 3 is a process flow diagram of a method for mobile modular battery charging and exchange according to one embodiment.

Referring now to FIG. 3, a method 300 for mobile modular battery charging and exchange will now be described. The method 300 describes operations of the components shown in FIG. 1, FIGS. 2A and 2B. The method 300 may be performed entirely or in part by the processor 120, other components of the computing device 114, the user device 104 and/or the server 106. For example, in one embodiment, method 300 is implemented by a computing system (e.g., the computing device 114) configured to execute a computer application. The computer application is configured to process data in electronic form and includes stored executable instructions that perform the functions of method 300. For simplicity, the method 300 will be described with respect to the computing device 114 and the processor 120, however it is understood that the user device 104 and/or the server 106 may perform the same or similar functions.

Upon initiating the method 300, at block 302, the method 300 includes receiving an exchange request. For example, the server 106 may receive an exchange request from the user device 104 using, for example, the network 108. In other embodiments, the computing device 114 may receive the exchange request. The exchange request includes exchange request data about the user device 104, the battery device 140 and/or the battery 142, for example, a location of the battery device 140, a battery type, a remaining battery capacity, a charging voltage, a navigation route of the user device 104 and/or the battery device 140, among others. The exchange request may be initiated automatically by the user device 104 and/or manually by the user 138.

For example, the user device 104 may use the location of the battery device 140 to determine whether the user 138 is approaching last-mile navigation, using, for example, a navigation system (not shown) of the user device 104. Last-mile navigation bridges the gap between an end position obtained from a navigation system and the real destination. As an illustrative example, the user 138 reaches an end position of a navigation route, for example, a vehicle (not shown) drops the user 138 off at an intersection, however, the user 138 will have to travel another two miles to a final destination. Upon approaching the end position, the user device 104 determines the battery device 140 has a low charge and may not be able to facilitate travel of the user 138 to the final destination. Accordingly, the user device 104 transmits an exchange request to the server 106 indicating the user 138 needs a fully charged battery and/or needs to charge the battery device 140.

As another illustrative example, the user 138 is navigating to a final destination using the battery device 140 (e.g., riding a bike). The user 138 will not require the battery device 140 upon arrival to the final destination and/or the battery device 140 will require charging. Accordingly, upon approaching the final destination, the user device 104 transmits an exchange request to the server 106 indicating the user 138 needs to store the battery device 140 and/or charge the battery device 140.

Referring again to FIG. 3, at block 304, the method 300 includes receiving an availability status. For example, in one embodiment, the server 106 is an original equipment manufacturer (OEM) server that stores data about each of its vehicles, for example, the vehicle 102. The availability status includes availability charging data about one or more vehicles (not shown), including the vehicle 102, for example, a location of the vehicle 102, a recharging capacity of the vehicle 102, a type of selectively removable charging bin mounted in the vehicle storage space 134, a number of available batteries present, and a charge level of the batteries present, among others.

In some embodiments, the vehicle 102 may initiate block 304. For example, if the vehicle 102 is in a stopped state (e.g., parked, stopped in traffic, vehicle speed is less than or equal to a predetermined speed), the vehicle 102 may transmit the availability charging data to the server 106. In other embodiments, the navigation system 130 may predict the vehicle 102 will be in a future stopped state based on a navigation route or traffic data. In this embodiment, the vehicle 102 may transmit a predicted vehicle location and a predicted time the vehicle 102 will be in said location. Alternatively, the vehicle 102 may periodically transmit the availability charging data to the server 106 and/or the server 106 may periodically request the availability charging data from the vehicle 102.

At block 306, the method 300 may include pairing the vehicle 102 and the user device 104. For example, the processor 120 may pair the user device 104 with the vehicle 102 based on the data about the battery device 140 and/or the battery 142 (e.g., the exchange request data) and the data about the vehicle 102 (e.g., the availability charging data). In another embodiment, the processor 120 may pair the user device 104 with the vehicle 102 upon determining the vehicle 102 is in a stopped state (e.g., parked, stopped in traffic, vehicle speed is less than or equal to a predetermined speed) and is located along a last-mile navigation route of the user device 104. For example, the processor 120 may select a vehicle in proximity to the last-mile navigation route of the user device 104 to fulfill the exchange request. Thus, the selection and/or pairing is based on the data about the vehicle 102 and the data about the user device 104. As an illustrative example, the processor 120 determines an end position of a navigation route where the user 138 will being last-mile navigation to a final destination. The processor 120 may select a vehicle in proximity of the end position of the navigation route that has the capacity to charge the battery device 140 and/or provide a fully charged battery or fully charged battery device to the user 138.

At block 308, the method 300 may include managing access to the vehicle storage space 134 according to the exchange request and/or pairing. For example, the processor 120 manages access to the vehicle storage space 134 according to the exchange request and an exchange cost to allow removal of a charged battery device from a receptacle slot and insertion of a used user battery and/or device into the receptacle slot. For example, the processor 120 may allow for passive keyless entry to the vehicle 102 using the user device 104. As the user device 104 enters an area around the vehicle 102, the lock mechanism 218 may automatically release to allow the user 138 to open the front hood 202 of the vehicle 102 and access the vehicle storage space 134. Alternatively, the processor 120 may release the lock mechanism 218 and open the front hood 202. Once access has been granted to the vehicle storage space 134, the user 138 may remove the battery 210*a* from the receptacle slot 206 or remove the bike 216*a* from the receptacle slot 220. The user 138 may also insert a used battery device or a used battery, for example, the battery device 140 and/or the battery 142. This example will be described in further detail with block 408 of FIG. 4.

At block 310, the processor 120 completes the exchange request transaction. Block 310 will now be discussed with reference to method 400 of FIG. 4. As discussed above, a variable credit exchange system may be implemented to incentivize the owner (not shown) of the vehicle 102 to provide mobile battery exchange and storage, and incentivize the user 138 to utilize such services. Thus, in one embodiment, at block 402, the method 400 includes calculating an exchange cost. The exchange cost may be based on various factors including, but not limited to, location, time, demand, type of battery and/or battery device to be stored and/or charged, amount of charging needed, availability of available receptacle slots above to charge and/or store the particular battery and/or battery device, amount of time needed to charge and/or store. The exchange cost may be based in any type of currency or reward, for example, monetary currency (e.g., dollar, euro), bitcoin, stocks, bonds, discounts, coupons, and other types of rewards.

Figure 4:
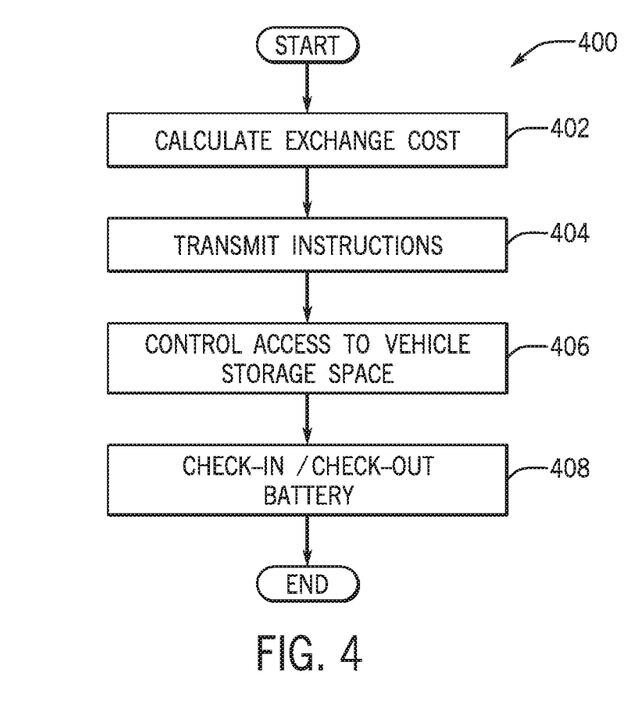
FIG. 4 is a process flow diagram of a method for mobile modular battery charging and exchange according to another embodiment.

At block 404, the method 400 includes transmitting instructions to the vehicle 102 and/or the user device 104 to complete the exchange and transaction. For example, the instructions may include routing instructions so the user 138 may navigate to the vehicle 102. The instructions may also include identifying information about the vehicle 102 (e.g., make, model, color) so the user 138 may easily identify the vehicle 102. The instructions may also include an estimated exchange cost as determined at block 402. In some embodiments, the exchange cost and location of multiple available vehicles may be provided to the user device 104 so the user 138 may select via the user device 104 which vehicle to complete the transaction. In this embodiment, the user device 104 may transmit the user input indicating a selected vehicle to the processor 120. Further, the instructions to the vehicle 102 and/or a user device (not shown) associated with the owner of the vehicle 102 may indicate that the user 138 has been paired to the vehicle 102.

At block 406, the method 400 may include controlling access to the vehicle storage space 134 as described above with block 308 of the method 300. Thus, in one example, as the user 138 approaches the vehicle 102, the vehicle 102 may transmit a signal to the lock mechanism 218 thereby releasing the lock mechanism 218 and/or opening the front hood 202. Accordingly, at block 408, the user 138 may complete a check-in/check-out process. In particular, the user 138 may remove a charged battery or a charged battery device, for example, the battery 210a from the receptacle slot 206. In some embodiments, the user 138 may in addition or in lieu of removing a charged battery or a charged battery device, insert a used battery or a used battery device, for example, the battery device 140 and/or the battery 142 into an available (e.g., empty) receptacle slot. In one embodiment, the vehicle 102 may provide a light indicator (not shown) near the battery to be removed and/or the receptacle slot to insert the used battery device or used battery. Thus, the user 138 may easily identify a charged battery and/or the receptacle slot to insert a used battery. The processor 120 may then complete the exchange cost transaction between the vehicle 102, the user device 104, and the server 106. Further, the vehicle 102 may automatically close the front hood 202 and activate the lock mechanism 218 upon the user 138 completing the exchange and the user 138 is detected to be outside of a predefined perimeter of the vehicle 102.

Figure 5:
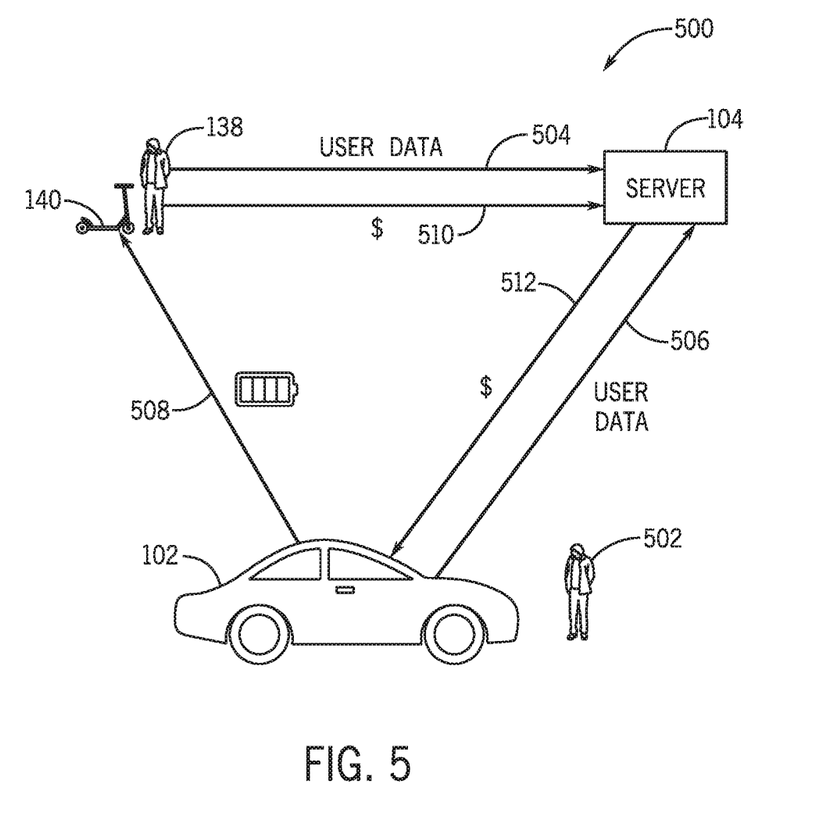
FIG. 5 is a high level diagram of the system of FIG. 1.

The systems and methods for mobile modular battery storage and exchange will now be described with respect to a high level system diagram of FIG. 5. The system 500 may include the vehicle 102, an owner and/or user 502 of the vehicle 102, the user 138, the battery device 140, and the server 106. Here, data 504 about the user 138 and/or the battery device 140 (e.g., exchange request data) is transmitted to the server 106, which may be an OEM server. Data 506 about the vehicle 102 and/or the owner 502 is also transmitted to the server 106. Charging and/or storage 508 is provided to the user 138 and the battery device 140 by the vehicle 102. The user 138 and or the battery device 140 provide an exchange cost 510 to the server 106 for the charging and/or storage 508. The server 106 provides a reward and/or currency 512 to the vehicle 102 for providing the charging and/or storage. Using the system 500 described herein, owners of vehicles are incentivized to provide mobile battery charging and storage, which may create and/or improve charging and storage infrastructures.

The embodiments discussed herein may also be described and implemented in the context of "computer-readable medium" or "computer storage medium." As used herein, "computer-readable medium" or "computer storage medium" refers to a non-transitory medium that stores instructions, algorithms, and/or data configured to perform one or more of the disclosed functions when executed. Computer-readable medium may be non-volatile, volatile, removable, and non-removable, media implemented in any method or technology for storage of information such as computer readable instructions, data structures, modules or other data. Computer-readable medium may include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device may interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for mobile charging and exchange, comprising:
    a vehicle having a vehicle storage space;
    a selectively removable charging bin mounted into the vehicle storage space, wherein the selectively removable charging bin has one or more form fitted receptacle slots for receiving a battery device and each receptacle slot has a connection therein to a power source of the vehicle; and
    a processor operatively connected for computer communication to the vehicle and a user device using a server over a network, wherein the processor:
    receives an exchange request from the user device;
    calculates an exchange cost for the exchange request; and
    manages access to the vehicle storage space according to the exchange request and the exchange cost to allow removal of the battery device from the receptacle slot and insertion of a used user battery device into the receptacle slot.

2. The system of claim 1, wherein the vehicle storage space is located in a front region of the vehicle.

3. The system of claim 2, wherein the vehicle storage space is located under a front hood of the vehicle.

4. The system of claim 2, wherein the exchange request includes data about the user battery device including a location of the user battery device and at least one of a battery type, a remaining battery capacity, and a charging voltage.

5. The system of claim 4, wherein the processor receives data about the vehicle including a location of the vehicle and at least one of a recharging capacity of the vehicle, a type of selectively removable charging bin mounted in the vehicle storage space, a number of available batteries present in the selectively removable charging bin, and a charge level of the batteries present in the selectively removable charging bin.

6. The system of claim 5, wherein the processor pairs the user device with the vehicle based on the data about the battery device and the data about the vehicle.

7. The system of claim 5, wherein the processor pairs the user device with the vehicle upon determining the vehicle is in a stopped state and is located along a last-mile navigation route of the user device.

8. The system of claim 1, wherein the exchange request is transmitted from the user device to the processor upon the user device entering a last-mile navigation route.

9. A vehicle for mobile charging and exchange, comprising:
    a vehicle storage space;
    a plurality of selectively removable charging bins mounted into the vehicle storage space, wherein each of the plurality of selectively removable charging bins has a form fitted receptacle slot for receiving a user battery device and the receptacle slot has a connection to interface with a power source of the vehicle;

a processor operatively connected for computer communication to the vehicle and a user device using a server over a network, wherein the processor:
  receives an exchange request from a user device; and
  calculates an exchange cost for the exchange request; and
  manages access to the vehicle storage space according to the exchange request and the exchange cost to allow removal of the user battery device from the receptacle slot and insertion of a used user battery device into the receptacle slot.

10. The vehicle of claim 9, wherein the vehicle storage space is located in a front region of the vehicle.

11. The vehicle of claim 9, wherein the vehicle storage space is located under a front hood of the vehicle.

12. The vehicle of claim 9, wherein the form fitted receptacle slot in one or more of the plurality of selectively removable charging bins has different shapes to form fit different battery types.

13. The vehicle of claim 9, wherein the plurality of selectively removable charging bins detachably latch to a surface of the vehicle storage space thereby providing removable and configurable placement of the plurality of selectively removable charging bins.

14. The vehicle of claim 9, wherein the user battery device is a micro-mobility device and the form fitted receptacle slot of at least one of the plurality of selectively removable charging bins is form fitted according to the shape of the micro-mobility device.

15. A computer-implemented method for mobile charging and exchange, comprising:
  receiving an exchange request from a user device wherein the exchange request includes data about a user battery device associated with the user device including a location of the user battery device and a last-mile navigation route;
  selecting a vehicle in proximity to the last-mile navigation route to fulfill the exchange request, wherein the vehicle has a vehicle storage space and a selectively removable charging bin mounted into the vehicle storage space and connected to a power source of the vehicle; and
  managing access to the vehicle storage space according to the exchange request to allow removal of a battery from the selectively removable charging bin and insertion of the user battery device into the selectively removable charging bin.

16. The computer-implemented method of claim 15, wherein the selectively removable charging bin has a plurality of receptacle slots each form fitted to a shape of the user battery device.

17. The computer-implemented method of claim 15, including receiving data about the vehicle including a location of the vehicle and at least one of a recharging capacity of the vehicle, a type of selectively removable charging bin mounted in the vehicle storage space, a number of available batteries present in the selectively removable charging bin, and a charge level of the batteries present in the selectively removable charging bin.

18. The computer-implemented method of claim 17, wherein selecting the vehicle is based on the data about the vehicle and the data about the user battery device.

19. The computer-implemented method of claim 15, including calculating a reward for the exchange request based on the data about the vehicle and the data about the user battery device.

20. The computer-implemented method of claim 19, including providing the reward to the vehicle upon completion of the exchange request.

* * * * *